United States Patent
Kita

(10) Patent No.: US 12,049,152 B2
(45) Date of Patent: Jul. 30, 2024

(54) INFORMATION PROCESSING METHOD AND INFORMATION PROCESSING SYSTEM FOR GENERATING A DELIVERY PLAN USING TRACTOR INFORMATION, TRAILER INFORMATION, AND DELIVERY INFORMATION

(71) Applicant: Panasonic Intellectual Property Management Co., Ltd., Osaka (JP)

(72) Inventor: Atsuyoshi Kita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 234 days.

(21) Appl. No.: 17/370,622

(22) Filed: Jul. 8, 2021

(65) Prior Publication Data
US 2021/0331604 A1 Oct. 28, 2021

Related U.S. Application Data

(63) Continuation of application No. PCT/JP2020/001142, filed on Jan. 16, 2020.

(30) Foreign Application Priority Data

May 27, 2019 (JP) .................. 2019-098744

(51) Int. Cl.
*B60L 58/13* (2019.01)
*B60L 53/57* (2019.01)
(Continued)

(52) U.S. Cl.
CPC ............ *B60L 58/13* (2019.02); *B60L 53/57* (2019.02); *G06Q 10/06313* (2013.01);
(Continued)

(58) Field of Classification Search
CPC ...... B60L 58/13; B60L 53/57; B60L 2200/28; G06Q 10/06313; G06Q 10/06315; G06Q 50/28; G01C 21/3469
See application file for complete search history.

(56) References Cited

U.S. PATENT DOCUMENTS 9,561,941 B1 * 2/2017 Watts .................. G05D 1/0212
9,792,576 B1 * 10/2017 Jamjoom .............. G05D 1/104
(Continued)

FOREIGN PATENT DOCUMENTS

CN 207697858 8/2018
CN 109102228 12/2018
(Continued)

OTHER PUBLICATIONS

Chen et al. "Optimal Routing and Charging of an Electric Vehicle Fleet for High-Efficiency Dynamic Transit Systems" (2016) (https://ieeexplore.ieee.org/ielaam/5165411/8388565/7763884-aam.pdf?tag=1) (Year: 2016).*
(Continued)

*Primary Examiner* — Sujay Koneru
(74) *Attorney, Agent, or Firm* — WENDEROTH, LIND & PONACK L.L.P.

(57) ABSTRACT

An information processing method includes: obtaining tractor information including a battery level of a tractor, trailer information including battery levels of trailers, and delivery information including identification information and destinations of goods to be delivered; generating a delivery plan using the tractor information, the trailer information, and the delivery information; and outputting the delivery plan generated. The delivery plan satisfies: (a) a first condition that, when moving the plurality of trailers, the tractor travels using at least one of a battery of a trailer being moved among the plurality of trailers or a battery of the tractor; and (b) a second condition that the battery level of the tractor is kept
(Continued)

above a first lower limit, and the battery levels of the trailers are kept above a second lower limit.

6 Claims, 10 Drawing Sheets

(51) Int. Cl.
    *G06Q 10/0631*     (2023.01)
    *G06Q 10/08*     (2024.01)
    *G01C 21/34*     (2006.01)

(52) U.S. Cl.
    CPC ....... *G06Q 10/06315* (2013.01); *G06Q 10/08* (2013.01); *B60L 2200/28* (2013.01); *G01C 21/3469* (2013.01)

(56) References Cited

U.S. PATENT DOCUMENTS

| | | | | |
|---|---|---|---|---|
| 10,145,881 | B1* | 12/2018 | Salter | B60L 58/14 |
| 10,514,690 | B1* | 12/2019 | Siegel | G05D 1/101 |
| 2002/0041174 | A1* | 4/2002 | Purkey | H01M 50/247 320/103 |
| 2002/0184078 | A1* | 12/2002 | Uyeki | G06Q 20/405 705/7.11 |
| 2003/0078802 | A1* | 4/2003 | Yonezawa | G06Q 10/06375 705/338 |
| 2010/0076825 | A1* | 3/2010 | Sato | B60L 53/65 705/14.1 |
| 2011/0079453 | A1* | 4/2011 | Wanger | B62M 7/16 180/11 |
| 2011/0114398 | A1* | 5/2011 | Bianco | B60K 1/04 320/109 |
| 2013/0221928 | A1* | 8/2013 | Kelty | B60L 58/24 320/134 |
| 2013/0340444 | A1* | 12/2013 | Bryant | F25D 29/001 62/62 |
| 2014/0097676 | A1* | 4/2014 | Kusumi | H02J 7/14 307/10.1 |
| 2014/0300182 | A1* | 10/2014 | James | B60R 16/03 307/10.1 |
| 2014/0365258 | A1* | 12/2014 | Vestal | G05D 1/0297 901/1 |
| 2016/0239802 | A1* | 8/2016 | Burch, V | H04W 4/70 |
| 2019/0011926 | A1* | 1/2019 | Konishi | B60L 53/00 |
| 2019/0090472 | A1* | 3/2019 | Crinklaw | A01B 69/008 |
| 2019/0180237 | A1* | 6/2019 | Mattingly | H04L 9/0825 |
| 2019/0193764 | A1* | 6/2019 | Cooper | B61L 17/00 |
| 2019/0228375 | A1* | 7/2019 | Laury | G05D 1/0088 |
| 2019/0235489 | A1* | 8/2019 | Cantrell | G08G 5/0069 |
| 2019/0287063 | A1* | 9/2019 | Skaaksrud | G05D 1/0276 |
| 2020/0001741 | A1* | 1/2020 | Fairweather | B60L 7/10 |
| 2020/0090117 | A1* | 3/2020 | Luo | G06Q 10/083 |
| 2020/0223422 | A1* | 7/2020 | Ye | B60K 6/485 |
| 2020/0233410 | A1* | 7/2020 | Burns | B60L 50/66 |
| 2020/0242543 | A1* | 7/2020 | Fu | G06Q 10/043 |
| 2020/0341467 | A1* | 10/2020 | Glendenning | G05D 1/0088 |
| 2021/0132625 | A1* | 5/2021 | Gillett | B62D 63/025 |
| 2023/0219440 | A1* | 7/2023 | Salter | B60W 20/20 320/109 |

FOREIGN PATENT DOCUMENTS

| | | |
|---|---|---|
| JP | 2005-350158 | 12/2005 |
| JP | 2010-102597 | 5/2010 |
| JP | 2011-111078 | 6/2011 |
| JP | 5262575 | 8/2013 |
| JP | 6270953 B1 * | 1/2018 |
| JP | 2018-106745 | 7/2018 |

OTHER PUBLICATIONS

International Search Report (ISR) issued on Mar. 31, 2020 in International (PCT) Application No. PCT/JP2020/001142.
Extended European Search Report issued Jul. 1, 2022 in corresponding European Patent Application No. 20813369.4.
Rezgui, Dhekra et al., "Application of a variable neighborhood search algorithm to a fleet size and mix vehicle routing problem with electric modular vehicles", Computers & Industrial Engineering, Mar. 2, 2019, vol. 130, pp. 537-550.
Office Action and Search Report issued on Apr. 23, 2024 in Chinese Patent Application No. 202080008248.6, with English translation of Search Report.

* cited by examiner

FIG. 4

(1) Vehicle information

| Vehicle | Battery information | | | Current location information | Start time of operation |
|---|---|---|---|---|---|
| | Battery capacity | Current battery level | Power consumption | | |
| Tractor 11 | 50 kWh | 100% | 0.5 km/kWh | Point 20 | 9:00 |
| Trailer 12 | 200 kWh | 100% | 0.2 km/kWh | Point 20 | 9:00 |
| Trailer 13 | 200 kWh | 100% | 0.2 km/kWh | Point 20 | 9:00 |

(2) Load information

| Load | Loading place | Time required for loading | Unloading place | Time required for unloading |
|---|---|---|---|---|
| 1 | Point 21 | 60 min | Point 24 | 150 min |
| 2 | Point 22 | 60 min | Point 23 | 70 min |

(3) Loading/unloading place information

| Loading/unloading place | Coordinate |
|---|---|
| Point 20 | X0, Y0 |
| Point 21 | X1, Y1 |
| Point 22 | X2, Y2 |
| Point 23 | X3, Y3 |
| Point 24 | X4, Y4 |

FIG. 6

| # | Details of operation | | Place | Time |
|---|---|---|---|---|
| 1 | Haul trailer 12 | Start | Point 20 | 9:00 |
| | | End | Point 21 | 9:20 |
| 2 | Travel alone | Start | Point 21 | 9:20 |
| | | End | Point 20 | 9:40 |
| 3 | Haul trailer 13 | Start | Point 20 | 9:40 |
| | | End | Point 22 | 10:00 |
| 4 | Travel alone | Start | Point 22 | 10:00 |
| | | End | Point 21 | 10:20 |
| 5 | Haul trailer 12 | Start | Point 21 | 10:20 |
| | | End | Point 24 | 10:40 |
| 6 | Travel alone | Start | Point 24 | 10:40 |
| | | End | Point 22 | 11:00 |
| 7 | Haul trailer 13 | Start | Point 22 | 11:00 |
| | | End | Point 23 | 11:20 |
| 8 | Haul trailer 13 | Start | Point 23 | 12:30 |
| | | End | Point 20 | 12:50 |
| 9 | Travel alone | Start | Point 20 | 12:50 |
| | | End | Point 24 | 13:10 |
| 10 | Haul trailer 12 | Start | Point 24 | 13:10 |
| | | End | Point 20 | 13:30 |

FIG. 7

| # | Details of operation | | Place | Time |
|---|---|---|---|---|
| 1 | Hauled by tractor 11 | Start | Point 20 | 9:00 |
| | | End | Point 21 | 9:20 |
| 2 | Carry in load 1 | Start | Point 21 | 9:20 |
| | | End | Point 21 | 10:20 |
| 3 | Hauled by tractor 11 | Start | Point 21 | 10:20 |
| | | End | Point 24 | 10:40 |
| 4 | Carry out load 1 | Start | Point 24 | 10:40 |
| | | End | Point 24 | 13:10 |
| 5 | Hauled by tractor 11 | Start | Point 24 | 13:10 |
| | | End | Point 20 | 13:30 |

FIG. 8

| # | Details of operation | | Place | Time |
|---|---|---|---|---|
| 1 | Hauled by tractor 11 | Start | Point 20 | 9:40 |
| | | End | Point 22 | 10:00 |
| 2 | Carry in load 2 | Start | Point 22 | 10:00 |
| | | End | Point 22 | 11:00 |
| 3 | Hauled by tractor 11 | Start | Point 22 | 11:00 |
| | | End | Point 23 | 11:20 |
| 4 | Carry out load 2 | Start | Point 23 | 11:20 |
| | | End | Point 23 | 12:30 |
| 5 | Hauled by tractor 11 | Start | Point 23 | 12:30 |
| | | End | Point 20 | 12:50 |

INFORMATION PROCESSING METHOD AND INFORMATION PROCESSING SYSTEM FOR GENERATING A DELIVERY PLAN USING TRACTOR INFORMATION, TRAILER INFORMATION, AND DELIVERY INFORMATION

CROSS REFERENCE TO RELATED APPLICATIONS

This is a continuation application of PCT International Application No. PCT/JP2020/001142 filed on Jan. 16, 2020, designating the United States of America, which is based on and claims priority of Japanese Patent Application No. 2019-098744 filed on May 27, 2019. The entire disclosures of the above-identified applications, including the specifications, drawings and claims are incorporated herein by reference in their entirety.

FIELD

The present disclosure relates to an information processing method and an information processing system.

BACKGROUND

In recent years, with the progress of the development of electric vehicle techniques, delivery of goods using electric vehicles has been suggested. For example, a vehicle powered by batteries mounted on both of a tractor and trailers, and traveling within a container terminal is suggested (see, e.g., Patent Literature (PTL) 1).

On the other hand, a method of making a plan for a gasoline vehicle is suggested (see, e.g., PTL 2), taking into consideration that a hauler travels with a load carrier separated therefrom. While the load carrier stops for a loading and unloading operation, the hauler hauls another load carrier.

CITATION LIST

Patent Literature

PTL 1: Japanese Unexamined Patent Application Publication No. 2011-111078
PTL 2: Japanese Unexamined Patent Application Publication No. 2005-350158

SUMMARY

Technical Problem

However, the related art techniques have difficulty in efficiently delivering goods using the batteries of a tractor and trailers.

To address the problem, the present disclosure provides an information processing method and an information processing system capable of efficiently delivering goods without running out at least one of the batteries of a tractor and a trailer connected to the tractor.

Solution to Problem

An information processing method according to an aspect of the present disclosure is executed by a computer. The information processing method includes: obtaining tractor information including a battery level of a tractor, trailer information including battery levels of a plurality of trailers, and delivery information including identification information and destinations of goods to be delivered; generating a delivery plan using the tractor information, the trailer information, and the delivery information; and outputting the delivery plan generated. The delivery plan causes the tractor to move the plurality of trailers, each carrying distributed ones of the goods, to the destinations, and satisfies: (a) a first condition that, when moving the plurality of trailers, the tractor travels using at least one of a battery of a trailer being moved among the plurality of trailers or a battery of the tractor; and (b) a second condition that the battery level of the tractor is kept above a first lower limit, and the battery levels of the plurality of trailers are kept above a second lower limit.

This general and specific aspect may be implemented using a system, a device, an integrated circuit, a computer program, or a computer-readable recording medium such as a CD-ROM, or any combination of systems, devices, integrated circuits, computer programs, or recording media.

Advantageous Effects

The information processing method, for example, according to the present disclosure efficiently delivers goods without running out at least one of the batteries of a tractor and a trailer connected to the tractor.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 illustrates an example of input data to the plan making device according to Embodiment 1.
FIG. 6 illustrates a first example of output data from the plan making device according to Embodiment.
FIG. 7 illustrates a second example of the output data from the plan making device according to Embodiment 1.
FIG. 8 illustrates a third example of the output data from the plan making device according to Embodiment 1.

Figure 1:
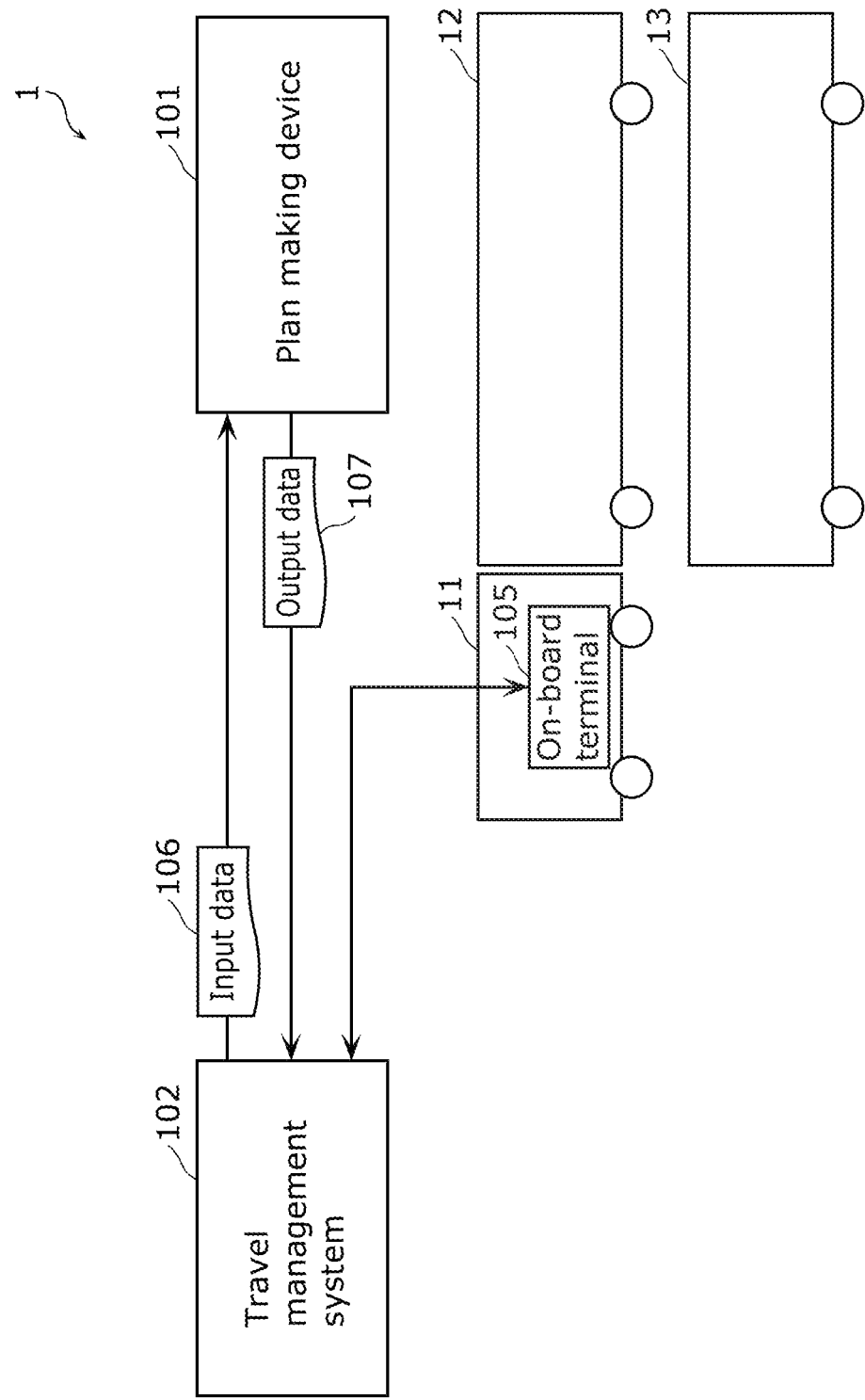
FIG. 1 illustrates a configuration of a delivery system according to Embodiment 1.

DESCRIPTION OF EMBODIMENTS (Underlying Knowledge Forming Basis of the Present Disclosure)

The present inventor has found the following problems in the technique of delivering goods using the electric vehicles described above in the "Background Art".

As described above, the related art techniques have difficulty in efficiently deliver goods using the batteries of the tractor and the trailers. Note that each of the tractor and the trailers will also be referred to as a "vehicle".

Specifically, there is a problem in mounting batteries in both of a tractor and trailers, and efficiently delivering goods without running out the batteries of these vehicles (particularly, the battery of the tractor).

For example, the related art technique shown in PTL 1 is applicable to the following case. The vehicle travels within the container terminal. The charged trailers are always near the tractor and the trailers can be replaced any time when the battery of the traveling tractor or trailer runs out. This technique is, however, not applicable to a vehicle traveling on a public road between distant points.

For example, the method of making a delivery plan using the hauling vehicle according to the related art shown in PTL 2 fails to take the energy charge for traveling into consideration. There may thus be a problem of running out the batteries, if the method is applied to an electric vehicle.

In this manner, the related art techniques have difficulty in efficiently delivering goods using the batteries of the tractor and the trailers.

To address the problem, the present disclosure provides an information processing method and an information processing system capable of efficiently delivering goods without running out at least one of the batteries of a tractor and a trailer connected to the tractor.

In order to achieve the objective, the information processing method according to an aspect of the present disclosure is executed by a computer. The information processing method includes: obtaining tractor information including a battery level of a tractor, trailer information including battery levels of a plurality of trailers, and delivery information including identification information and destinations of goods to be delivered; generating a delivery plan using the tractor information, the trailer information, and the delivery information; and outputting the delivery plan generated. The delivery plan causes the tractor to move the plurality of trailers, each carrying distributed ones of the goods, to the destinations, and satisfies: (a) a first condition that, when moving the plurality of trailers, the tractor travels using at least one of a battery of a trailer being moved among the plurality of trailers or a battery of the tractor; and (b) a second condition that the battery level of the tractor is kept above a first lower limit, and the battery levels of the plurality of trailers are kept above a second lower limit.

According to the aspect, with the battery levels of the tractor and the trailers taken into consideration, a delivery plan is made that allows delivery of goods while keeping the battery levels above the lower limit during the delivery period. The tractor and the trailers then travel in accordance with the made delivery plan to deliver goods while keeping the battery levels of the tractor and the trailers above the lower limit during the delivery period. Accordingly, the information processing method described above allows efficient delivery of goods without running out at least one of the batteries of the tractor and the trailer connected to the tractor.

For example, the generating may include generating the delivery plan that further satisfies a third condition that at least one of the plurality of trailers is charged at at least one of the destinations.

According to the aspect, the delivery plan is made with the charging of the trailers at the destinations taken into consideration. Thus, even if the tractor and the trailers fail to have sufficient levels of the batteries at the initial stage of the delivery period, the delivery of goods can be completed by the charging as necessary during the delivery period. In this manner, the information processing method described above allows efficient and more proper delivery of goods without running out at least one of the batteries of the tractor and the trailer connected to the tractor, with the charging during the delivery period taken into consideration.

For example, the at least one of the plurality of trailers may be charged when carrying in or out the distributed ones of the goods to be delivered by the at least one of the plurality of trailers.

According to the aspect, the trailers are charged when carrying in or out the goods to be delivered. There is thus no need to take any dedicated time for charging the trailers. If there is a need to take the dedicated time for charging, this time may extend the delivery period. In this manner, goods can be efficiently delivered without taking any dedicated time for charging during the delivery period or without running out at least one of the batteries of the tractor and the trailer connected to the tractor.

For example, the generating may include generating the delivery plan that further satisfies a fourth condition that the battery of the tractor is charged using the battery of the one of the plurality of trailers that is being moved.

According to the aspect, the tractor is charged while hauling a trailer and moving. There is thus no need to take any dedicated time for charging. If there is a need to take the dedicated time for charging, this time may extend the delivery period. In this manner, goods can be efficiently delivered without taking any dedicated time for charging during the delivery period or without running out at least one of the batteries of the tractor and the trailer connected to the tractor.

For example, the generating may include generating the delivery plan that further satisfies a fifth condition that the battery level of the tractor is kept at a first upper limit or lower, and the battery levels of the plurality of trailers are kept at a second upper limit or lower.

According to the aspect, the battery level of each of the tractor and the trailers is kept not to exceed the upper limit of the recommended range of the battery level during the delivery period. This reduces the deterioration of the batteries of the tractor and the trailers. Accordingly, goods can be efficiently delivered without running out the batteries while reducing the deterioration of at least one of the batteries of the tractor and the trailer connected to the tractor.

For example, the generating may include generating, as the delivery plan, one candidate out of a plurality of candidates for the delivery plan each satisfying at least the first condition and the second condition, the one candidate satisfying a condition related to a time required to deliver the goods.

According to the aspect, the delivery plan requiring a shorter delivery period is preferentially generated. In accordance with the generated delivery plan, the tractor and the trailers complete the delivery of goods in a shorter time. Using a vehicle driven by the batteries mounted on both of a tractor and a trailer connected to the tractor, goods can be efficiently delivered in a shorter time without running out the batteries.

An information processing system according to an aspect of the present disclosure includes: an obtainer that obtains tractor information including a battery level of a tractor, trailer information including battery levels of a plurality of trailers, and delivery information including identification information and destinations of goods to be delivered; a plan maker that generates a delivery plan using the tractor information, the trailer information, and the delivery information; and an outputter that outputs the delivery plan generated. The delivery plan causes the tractor to move the plurality of trailers, each carrying distributed ones of the goods, to the destinations, and satisfies: (a) a first condition that, when moving the plurality of trailers, the tractor travels using at least one of a battery of a trailer being moved among the plurality of trailers or a battery of the tractor; and (b) a second condition that the battery level of the tractor is kept above a first lower limit, and the battery levels of the plurality of trailers are kept above a second lower limit.

The aspect provides the same advantages as the information processing method described above.

These general and specific aspects may be implemented using a system, a device, an integrated circuit, a computer program, or a computer-readable recording medium such as a CD-ROM, or any combination of systems, devices, integrated circuits, computer programs, or recording media.

Now, embodiments will be described in detail with reference to the drawings.

Note that the embodiments described below are mere comprehensive or specific examples. The numerical values, shapes, materials, constituent elements, the arrangement and connection of the constituent elements, steps, step orders etc. shown in the following embodiments are thus mere examples, and are not intended to limit the scope of the present disclosure. Among the constituent elements in the following embodiments, those not recited in any of the independent claims defining the broadest concept of the present disclosure are described as optional constituent elements.

Embodiment 1

Described in this embodiment will be an information processing method and an information processing system etc. capable of efficiently delivering goods without running out at least one of the batteries of a tractor and a trailer connected to the tractor.

FIG. 1 illustrates a configuration of delivery system 1 according to this embodiment. Delivery system 1 is for delivering goods using tractor 11 and trailers 12 and 13. Note that the number of the trailers is not limited to two and may be more than two.

Each of tractor 11 and trailers 12 and 13 is an electric vehicle. Tractor 11 includes a motor that is a power source for travel, and a battery that supplies electric power to the motor, and travels in accordance with the operation of the driver seated on the driver's seat. The battery of tractor 11 has a relatively low capacity. This relatively low capacity of the battery of tractor 11 is attributed to the fact that tractor 11 has a relatively small, limited space for mounting the battery.

Each of trailers 12 and 13 includes a battery and a bed mounting goods to be delivered. The batteries of trailers 12 and 13 have a relatively high capacity. This relatively high capacity of the batteries of trailers 12 and 13 is attributed to the fact that trailers 12 and 13 have a relatively large, less limited space for mounting the battery.

Connected to tractor 11 may be trailer 12, for example. For example, if trailer 12 is connected, tractor 11 travels while hauling trailer 12. In addition, trailer 12 may supply electric power to tractor 11. Accordingly, tractor 11 travels with electric power of at least one of the batteries mounted on tractor 11 and trailer 12 connected to tractor 11. Each of tractor 11 and trailers 12 and 13 etc. will also be referred to as a "vehicle".

Delivery system 1 shown in FIG. 1 includes plan making device 101, travel management system 102, and on-board terminal 105.

Plan making device 101 makes delivery plans. Plan making device 101 receives data (i.e., input data 106) from travel management system 102, and makes the delivery plans based on received input data 106. In addition, plan making device 101 transmits data (i.e., output data 107) including the made delivery plans to travel management system 102. Plan making device 101 is a web server, for example. Note that plan making device 101 may be a different server from travel management system 102 or may be a different process performed on the same server as travel management system 102.

On-board terminal 105 is a computer terminal placed on tractor 11 (e.g., the driver's seat of tractor 11), and is a car navigation system, a smartphone, or a tablet, for example. On-board terminal 105 receives the delivery plans from travel management system 102, and displays the received delivery plans on a screen. In addition, on-board terminal 105 transmits, to travel management system 102, the progresses of transportation, the current locations, the current battery levels of tractor 11 and trailer 12 etc. and other information.

Travel management system 102 manages the travel of the vehicles. Travel management system 102 is communicatively connected to plan making device 101 and on-board terminal 105 via a network. The network includes various networks such as mobile phone line network, a public network, and the Internet.

Figure 2:
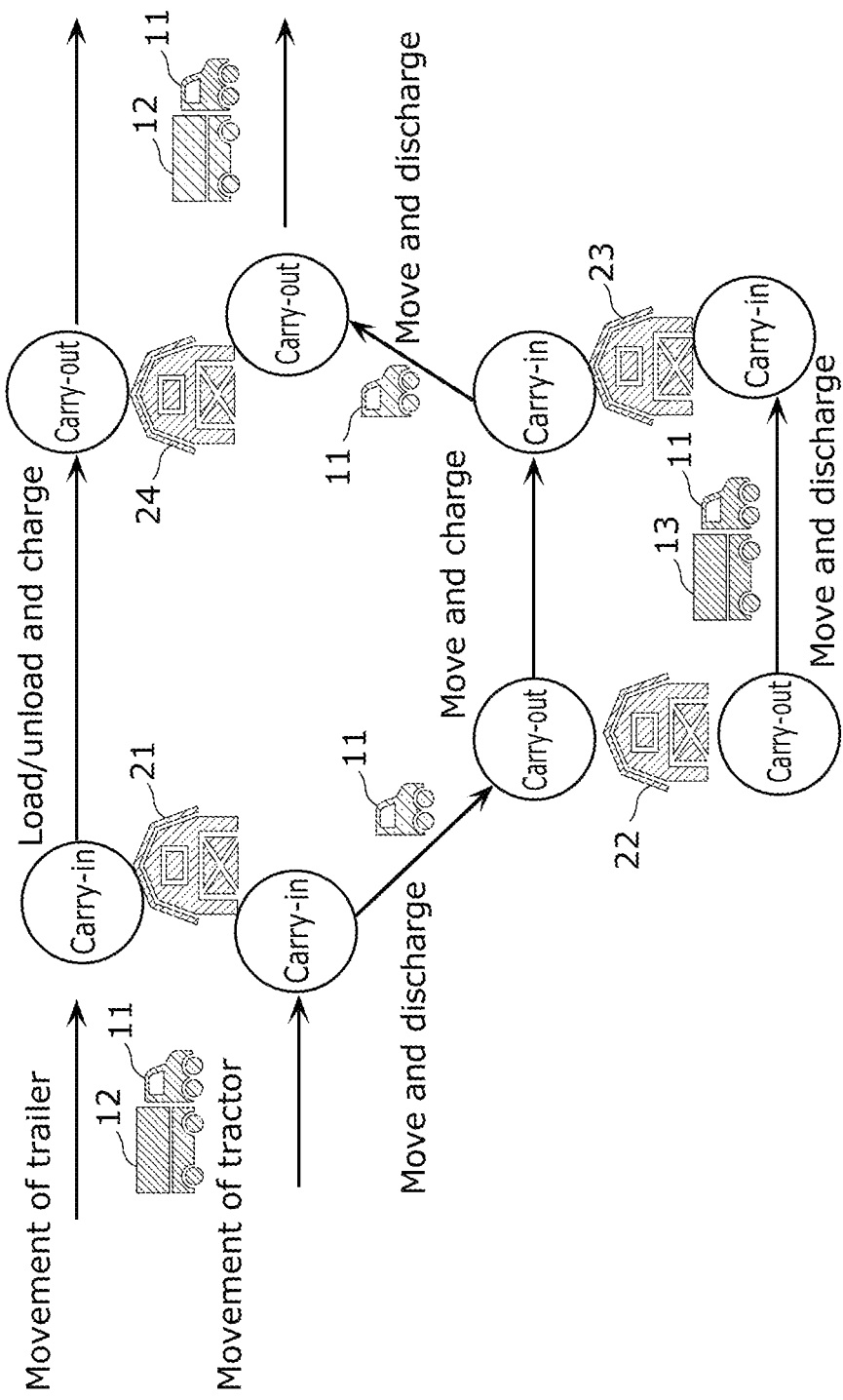
FIG. 2 illustrates a tractor and trailers.

FIG. 2 illustrates tractor 11 and trailers 12 and 13. The delivery of goods by tractor 11 and trailers 12 and 13 will be described with reference to FIG. 2.

In FIG. 2, assume that tractor 11 and trailer 12 house goods to be delivered to point 21. Also, assume that trailer 13 housing goods to be delivered to point 23 is located at point 22.

Tractor 11 moves to point 21 while hauling trailer 12. At point 21, trailer 12 is separated from tractor 11. After that, tractor 11 moves to point 22. At point 21, the goods to be delivered are unloaded from trailer 12, and the battery of trailer 12 is charged.

After moving to point 22, with trailer 13 connected, tractor 11 moves to point 23 while hauling trailer 13.

At point 23, trailer 13 is separated from tractor 11. After that, tractor 11 moves to point 24. At point 23, the goods to be delivered are unloaded from trailer 13, and the battery of trailer 13 is charged.

After moving to point 24, with trailer 12 connected, tractor 11 moves to the next point (not shown) while hauling trailer 12.

In this manner, tractor 11 can travel alone or while hauling any of the plurality of trailers 12 and 13. An example will be described where single tractor 11 can haul a single trailer at one time. The description also applies to the case where single tractor 11 can haul two or more trailers at one time.

Figure 3:
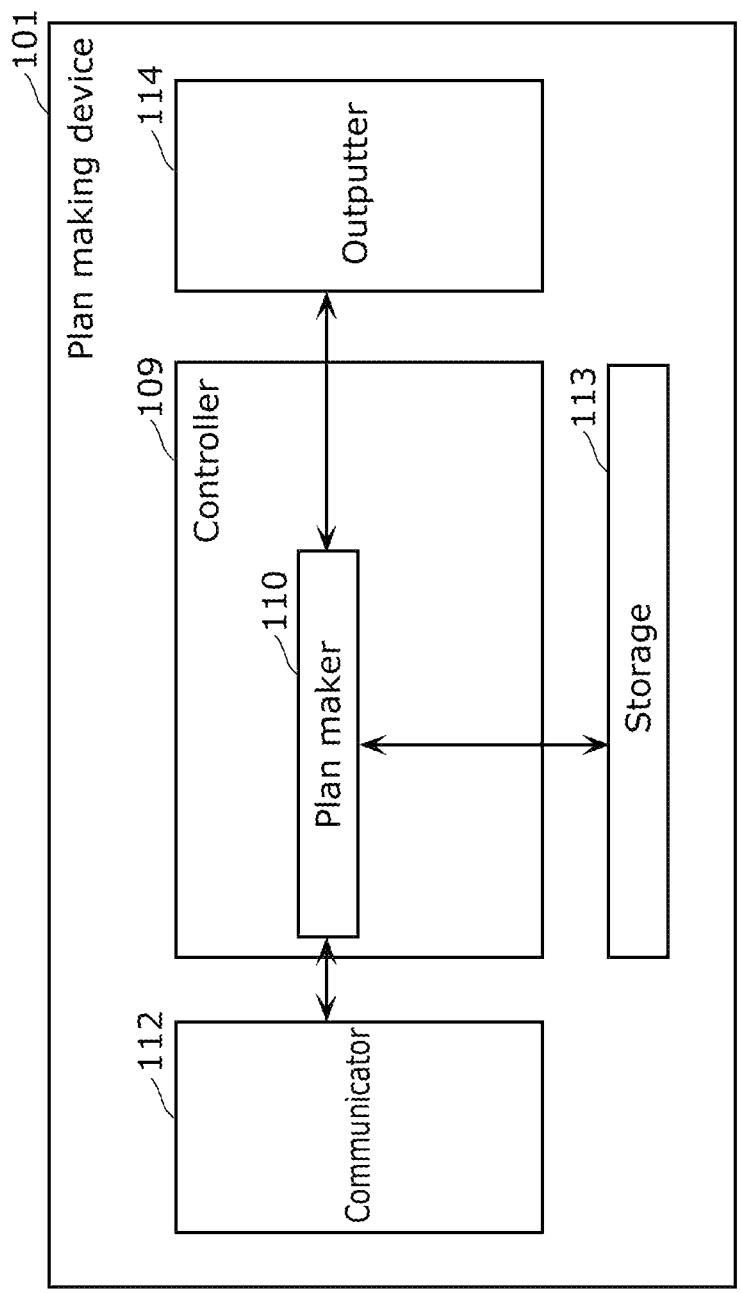
FIG. 3 is a block diagram showing a configuration of a plan making device according to Embodiment 1.

FIG. 3 is a block diagram showing a configuration of plan making device 101 according to this embodiment. Plan making device 101 shown in FIG. 3 includes controller 109, communicator 112, storage 113, and outputter 114.

Controller 109 controls the operation of plan making device 101. Controller 109 can be achieved by a processor such as a central processing unit (CPU) executing programs using a memory. Controller 109 controls the operations of the components of plan making device 101.

Controller 109 includes plan maker 110. Plan maker 110 makes delivery plans of goods in accordance with a flowchart which will be described later. Here, the delivery plans are for causing tractor 11 to move the plurality of trailers 12 and 13, each carrying distributed ones of the goods to be delivered, to respective destinations. In other words, the delivery plans are the information on how tractor 11 and the plurality of trailers 12 and 13 have moved and delivered the goods to the respective destinations during the delivery period. Here, the "delivery period" runs from the start to the end of the delivery.

Communicator 112 is a communication interface that communicates with travel management system 102 via a network. Communicator 112 receives input data 106. Accordingly, communicator 112 obtains, as an obtainer, tractor information including the battery level of tractor 11, trailer information including the battery levels of the plurality of trailers 12 and 13, and delivery information including identification information and destinations of the goods to be delivered.

Storage 113 is a semiconductor memory, for example, storing various information. Storage 113 stores, for example, map data used in common by plan maker 110 for making a plan every time. In addition, storage 113 stores interim information temporarily output by plan maker 110 while making a plan. If storage 113 stores the tractor information, the trailer information, and the delivery information; plan maker 110 obtains, as an obtainer, such the information from storage 113.

Outputter 114 outputs various information. Outputter 114 outputs, to files, the made delivery plans, the logs at the time of making the delivery plans, and error messages, for example.

FIG. 4 illustrates an example of input data 106 to plan making device 101 according to this embodiment. Input data 106 is input from travel management system 102 to plan making device 101. Input data 106 includes at least (1) vehicle information, (2) load information, and (3) loading/unloading place information. Here, the vehicle information corresponds to the tractor information and the trailer information. In addition, the load information and the loading/unloading place information correspond to the identification information and destinations of the goods to be delivered.

For example, FIG. 4 shows an example of input data 106 for transporting two loads using single tractor 11 and two trailers 12 and 13.

The vehicle information shown in (1) of FIG. 4 includes the battery information, the current location information, and the start time of operation of each vehicle. The battery information includes the battery capacity, the current battery level, and the power consumption of each vehicle. The power consumption of tractor 11 is represented by the distance in which tractor 11 can travel alone with certain electric power (e.g., electric power of 1 kWh). The power consumption of trailer 12 or 13 is represented by the distance in which trailer 12 or 13 travels with certain electric power (e.g., electric power of 1 kWh) while being hauled by tractor 11 and supplying the electric power from the battery of trailer 12 or 13 to tractor 11.

The load information shown in (2) of FIG. 4 includes the loading place, the time required for loading, the unloading place, and the time required for unloading of each load.

The loading/unloading place information shown in (3) of FIG. 4 includes the coordinate of each loading and unloading place. Each coordinate is the coordinate on a map, for example, but may be replaced with the latitude and longitude or an address.

Now, processing of plan maker 110 making a delivery plan will be described using the example of input data 106 shown in FIG. 4.

Figure 5:
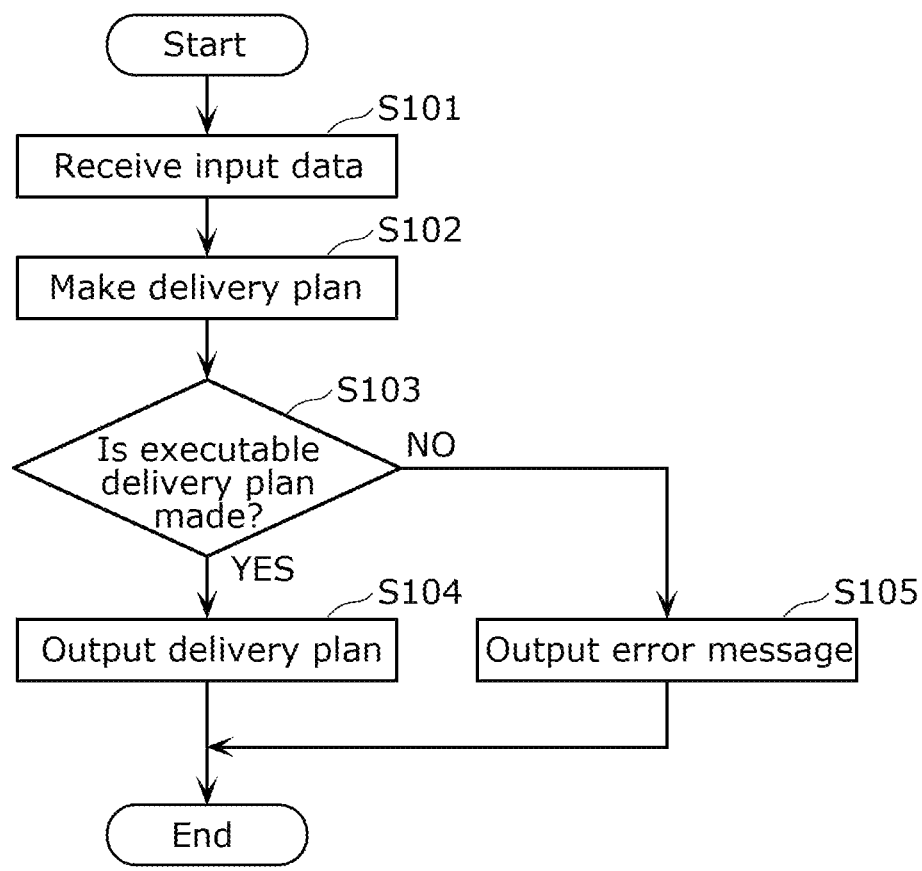
FIG. 5 is a flowchart showing an operation of the plan making device according to Embodiment 1.

FIG. 5 is a flowchart showing an operation of plan making device 101 according to this embodiment.

In step S101, communicator 112 receives input data 106. Accordingly, communicator 112 obtains the tractor information including the battery level of the tractor, trailer information including the battery levels of the plurality of trailers, and delivery information including identification information and destinations of goods to be delivered.

In step S102, plan maker 110 makes a delivery plan using input data 106 received in step S101 by communicator 112.

The making of the delivery plan in step S102 will be described. The delivery plan is obtained by solving the minimum cost flow problem on the graph created as follows. For example, the vertexes represent the states whether the arrival at and departure from the loading and unloading place of each vehicle is completed at each time. The edges represent the transitions between the states. The minimum cost flow problem is one type of mixed integer programming problems, and can thus be solved using a commercially available mixed integer programming problem solver, for example.

When formulating the minimum cost flow problem, plan maker 110 takes into consideration the limiting condition of the amount of power consumption when passing through each edge of the graph, for example. Accordingly, plan maker 110 makes a delivery plan not to run out the battery of each vehicle. In addition to the limiting condition described above, the limiting conditions may include conditions indicating various ways how the vehicles travel, or charging the batteries of the vehicles.

Using the minimum cost flow problem, the costs of the edges of the graph and the limiting conditions can be changed to make various delivery plans. Depending on the limiting conditions, a plurality of delivery plans may be made. In this case, a delivery plan satisfying a predetermined condition may be made preferentially, using an objective function. For example, the distances of the loading and unloading points are regarded as costs, whose sum is regarded as the objective function. To minimize the objective function, the minimum cost flow problem is solved. As a result, a delivery plan is obtained with the minimum travel distances of the vehicles.

As a result of the processing in step S102, plan maker 110 makes an executable delivery plan or cannot make any executable delivery plan.

In step S103, plan maker 110 receives the result of the processing in step S102, the processing is divided depending on whether an executable delivery plan is made. If an executable delivery plan is made (Yes in step S103), the process proceeds to step S104. If no executable delivery plan is made (No in step S103), the process proceeds to step S105.

In step S104, outputter 114 outputs the made delivery plan as output data 107 and transmits output data 107 to travel management system 102.

In step S105, outputter 114 transmits, to travel management system 102, an error message indicating that no executable delivery plan can be made.

Through the processing in above steps S101 to S105, plan making device 101 outputs a delivery plan or an error message.

Making of a delivery plan in above step S102 will be described further in detail.

In step S102, plan maker 110 generates a delivery plan that causes the tractor to move a plurality of trailers, each carrying distributed ones of the goods to be delivered, to the destinations. This delivery plan satisfies (a) a first condition and (b) a second condition. Under (a) the first condition, when moving the plurality of trailers, the tractor travels using at least one of a battery of a trailer being moved among the plurality of trailers or a battery of the tractor. Under (b) the second condition, the battery level of the tractor is kept above a first lower limit, and the battery levels of the plurality of trailers are kept above a second lower limit. Plan maker 110 generates the delivery plan described above using the tractor information, the trailer information, and the delivery information. Note that the "battery level(s) . . . above the . . . lower limit" means that the battery level is higher than the lower limit.

Here, the first lower limit is zero, for example. Accordingly, the battery level of the tractor is kept above zero, that is, the battery of the tractor does not run out during the delivery period. On the other hand, the second lower limit is zero, for example. Accordingly, the battery level of each trailer is kept above zero, that is, the batteries of the trailers do not run out during the delivery period.

The first lower limit is, for example, the lower limit of the recommended range of the battery level of the tractor and may be higher than zero. Here, within the "recommended range", each battery is free from overdischarge which may deteriorate the battery. Accordingly, the battery of the tractor is kept away from the overdischarge during the delivery period. On the other hand, the second lower limit is, for example, the lower limit of the recommended range of the battery level of each trailer and may be higher than zero. Accordingly, the battery of each trailer is kept away from the overdischarge during the delivery period.

At this time, plan maker 110 may generate a delivery plan satisfying the following condition (i.e., a fourth condition). Under the condition, while one of the plurality of trailers is moved, the battery of the tractor is charged using the battery of the one of the plurality of trailers.

Plan maker 110 may generate a delivery plan satisfying the following condition (i.e., a fifth condition). Under the condition, the battery level of the tractor is kept at a first upper limit or lower, and the battery levels of the plurality of trailers are kept at a second upper limit or lower.

Assume that plan maker 110 may generate a plurality of delivery plans satisfying the limiting conditions. In this case, plan maker 110 may preferentially generate a delivery plan requiring the shortest time for delivery of goods out of the plurality of possible delivery plans. The delivery plans may be generated by solving the minimum cost flow problem to minimize the objective function which is the time required for delivery of the goods.

FIGS. 6, 7, and 8 illustrate examples of output data 107 from plan making device 101 according to this embodiment. Each of the delivery plans shown in FIGS. 6, 7, and 8 is a list of operations of the vehicles of tractor 11 and trailers 12 and 13, and includes the start time, end time, and place of each operation.

For example, in the operation shown in #1 of FIG. 6, tractor 11 hauls trailer 12 and moves from point 20 to point 21. The movement starts at 9:00 and ends at 9:20. On the other hand, in the operation shown in #1 of FIG. 7, trailer 12 moves from point 20 to point 21 while being hauled by tractor 11. The movement starts at 9:00 and ends at 9:20. These also apply to the other operations shown in FIGS. 6, 7, and 8.

Figure 9:
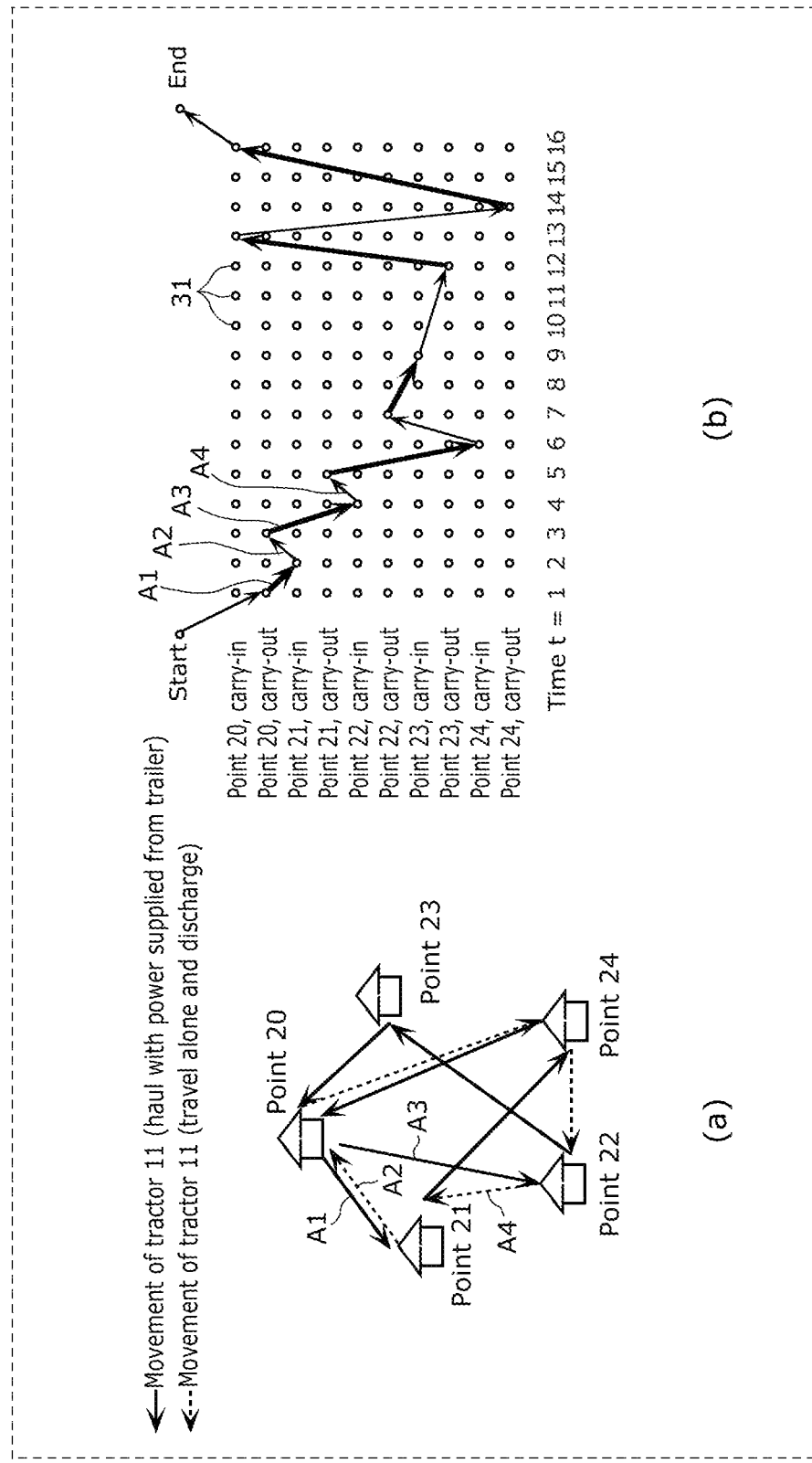
FIG. 9 illustrates example travel of the tractor according to Embodiment 1.
Figure 10:
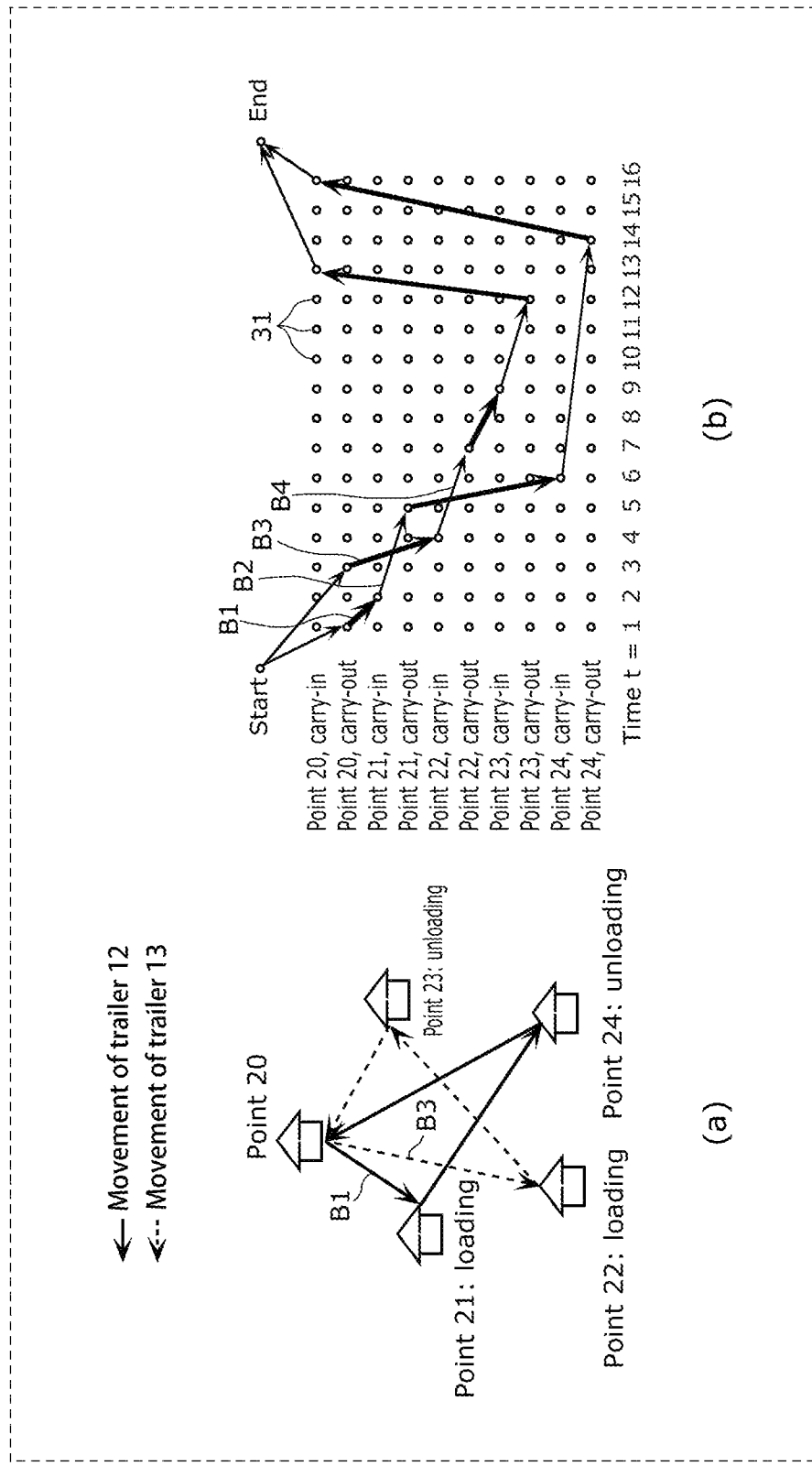
FIG. 10 illustrates example travel of the trailers according to Embodiment 1.

FIGS. 9 and 10 illustrate example travel of tractor 11 as well as trailers 12 and 13.

In FIG. 9, (a) schematically shows how tractor 11 moves between points such as points 20 and 21. For example, the figure shows that tractor 11 moves from point 20 to point 21 (i.e., solid arrow A1) and then from point 21 to point 20 (i.e., dotted arrow A2).

In FIG. 9, (b) is a graph showing the movement of tractor 11 at each time. The plurality of vertexes 31 in this graph correspond to the states whether the carry-in of loads (i.e., arrival) and the carry-out of loads (i.e., departure) of each vehicle is completed at each time. The arrows (e.g., arrow A1) in (b) of FIG. 9 have the same reference signs as the movements in (a) of FIG. 9 corresponding to the arrows.

In FIG. 10, (a) and (b) schematically show how trailers 12 and 13 move between points such as points 20 and 21, which is represented in the same manner as in (a) and (b) of FIG. 9.

Next, limiting conditions of the delivery plan will be described with reference to (b) of FIG. 9. The same description also applies to (b) of FIG. 10.

First, variables

[Math. 1]

$x_{ij}^k$, $y_{ij}^k$, $p_i^k$, and $q_i$ will be described.

In (b) of FIG. 9, if vertexes are connected by an arrow, it means that there is a transition between the states corresponding to the vertexes. If vertexes are not connected by an arrow, it means that there is no transition between the states corresponding to the vertexes. For example, if states i and j are connected by an arrow, it means that there is a transition from state i to state j.

[Math. 2]

$x_{ij}^k$ is a variable indicating whether there is a transition between states of trailer k.

$$x_{ij}^k = \begin{cases} 1: \text{There is a transition from } i \text{ to } j. \\ 0: \text{There is no transition from } i \text{ to } j. \end{cases} \quad \text{[Math. 3]}$$

[Math. 4]

$y_{ij}$ is a variable indicating whether there is a transition between states of the tractor.

$$y_{ij} = \begin{cases} 1: \text{There is a transition from } i \text{ to } j. \\ 0: \text{There is no transition from } i \text{ to } j. \end{cases} \quad \text{[Math. 5]}$$

[Math. 6]

$p_i^k$ is a variable indicating the battery level of trailer k in state i.

[Math. 7]

$q_i$ is a variable indicating the battery level of the tractor in state i.

The limiting conditions expressed by the above variables will be described below.

The limiting condition defining the changes in the battery levels of the trailer and the tractor in the transition from state i to state j while the trailer is hauled by the tractor is expressed by following Equation (1) and Expressions (2).

[Math. 8]

$$q_i + p_i^k = q_j + p_j^k + P_{ij}^k \quad (1)$$

where $P\min \leq p_i^k \leq P\max$ and $Q\min \leq q_i \leq Q\max$ (2)

In this Equation (1),

[Math. 9]

$P_{ij}$ is the amount of the electric power charged or discharged in the transition from state i to state j. A positive value represents the discharge, whereas a negative value represents the charge.

Under the limiting condition according to above Equation (1),

[Math. 10]

$P_{ij}$ with a positive value corresponds to the first condition. Under the first condition, when moving the plurality of trailers, the tractor travels using at least one of a battery of a trailer being moved among the plurality of trailers or a battery of the tractor.

In above Expressions (2), Pmin and Pmax respectively represent the lower limit value and the upper limit value of the recommended range of the battery level of the trailer. On the other hand, Qmin and Qmax respectively represent the lower limit value and the upper limit value of the recommended range of the battery level of the tractor. That is, out of the condition included in Expressions (2) described above, the part corresponding to following Expressions (3) corresponds to the second condition.

[Math. 11]

$$P\min \leq p_i^k \text{ and } Q\min \leq q_i \quad (3)$$

Out of the condition included in Expressions (2) described above, the part corresponding to following Expressions (4) corresponds to the fifth condition.

[Math. 12]

$$p_i^k \leq P\max \text{ and } q_i \leq Q\max \quad (4)$$

A limiting condition defines a change in the battery level of the trailer or the tractor in the transition from state i to state j, while the trailer is hauled by the tractor. The limiting condition assumes that the vehicle travels only with the electric power from the battery of the trailer. This limiting condition is expressed by following Expressions (5)

[Math. 13]

$$p_i^k = p_j^k + P_{ij} x_{ij} \text{ but } P\min \leq p_i^k \leq P\max \quad (5)$$

The limiting condition indicating that the tractor necessarily moves when the trailer moves is expressed by following Expression (6).

[Math. 14]

$$x_{ij}^k \leq y_{ij} \quad (6)$$

A limiting condition indicates an inexecutable order of transition or an inexecutable time for transition in view of the order of visit, the travel time, and the time required for unloading in the transition from state i to state j. This limiting condition is expressed by following Equation (7).

[Math. 15]

$$x_{ij}^k = 0 \quad (7)$$

After a trailer has arrived at each point, the trailer departs from the arrival point. This limiting condition is expressed by following Equation (8).

[Math. 16]

$$\Sigma_{j \in in(i)} x_{ji}^k = \Sigma_{j \in out(i)} x_{ij}^k \quad (8)$$

While a trailer is moved, the battery of the tractor is charged using the battery of the moving trailer. This limiting condition is expressed by following Equations (9). This limiting condition corresponds to the fourth condition.

[Math. 17]

$$q_i + Q_{ij} y_{ij} = q_j \text{ and } p_i^k - Q_{ij} x_{ij}^k = p_j^k \quad (9)$$

In this Equations (9),

[Math. 18]

$Q_{ij}$ is the amount of the electric power for charging the battery of the tractor using the battery of the trailer in the transition from state i to state j, and is zero or a positive value.

As an example, the objective function where the operation time of the tractor is minimized is expressed by Equation (10). Here, t represents an end.

[Math. 19]

$$\Sigma_{j \in in(i)} c_i y_{it} \quad (10)$$

Now, a delivery plan made by plan maker 110 will be described.

The delivery plan of tractor 11 is shown in FIG. 6, and the travel of tractor 11 according to this delivery plan is shown in FIG. 9.

First, tractor 11 hauls trailer 12 from point 20 to point 21. During the time, tractor 11 travels with the electric power supplied from trailer 12. This movement of tractor 11 is represented by #1 in FIG. 6 as well as arrow A1 in (a) and (b) of FIG. 9. On the other hand, the movement of trailer 12 is represented by #1 in FIG. 7 as well as arrow B1 in (a) and (b) of FIG. 10.

Next, during the loading operation of trailer 12 at point 21, tractor 11 returns alone to point 20, while consuming the electric power of its own battery. This movement of tractor 11 is represented by #2 in FIG. 6 as well as arrow A2 in (a) and (b) of FIG. 9. The loading operation of trailer 12 is represented by #2 in FIG. 7 as well as arrow B2 in (b) of FIG. 10.

Then, tractor 11 hauls trailer 13 from point 20 to point 22. During the time, tractor 11 travels with the electric power supplied from trailer 13 to charge its own battery. This movement of tractor 11 is represented by #3 in FIG. 6 as well as arrow A3 in (a) and (b) of FIG. 9. On the other hand, the movement of trailer 13 is represented by #1 in FIG. 8 as well as arrow B3 in (a) and (b) of FIG. 10.

After that, during the loading operation of trailer 13 at point 22, tractor 11 moves alone to point 21. This movement of tractor 11 is represented by #4 in FIG. 6 as well as arrow A4 in (a) and (b) of FIG. 9. The loading operation of trailer 13 is represented by #2 in FIG. 8 as well as arrow B4 in (b) of FIG. 10.

Similarly, subsequently, while trailer 12 stops for the loading and unloading operation, tractor 11 moves while hauling another trailer. In addition, tractor 11 consumes its own battery when traveling alone, and travels with the electric power supplied from the trailer to charge its own battery when traveling while hauling the trailer.

With this configuration, a delivery plan can be made which is for traveling a long distance without causing the state where tractor 11 cannot move and stops to wait for the completion of the loading and unloading operation of the trailer and the state where tractor 11 stops only for charging. In accordance with the made delivery plan, the vehicles travel at a higher operation rate as an advantage.

The loading and unloading operation of a trailer requires time longer than zero. During the loading and unloading operation of the trailer, the delivery period can be reduced by causing tractor 11 to haul another trailer at another point and deliver loads. As described above, tractor 11 delivers the loads as follows. While the first trailer out of the plurality of trailers delivers all the loads to its delivery destination, the second trailer different from the first trailer out of the plurality of trailers delivers the other loads. In other words, the first and second trailers deliver the loads as described above so that delivery system 1 efficiently deliver goods.

Embodiment 2

In this embodiment, the following information processing method and information processing system will be described with charging at a charging station taken into consideration. The method and system allow efficient delivery of goods without running out at least one of the batteries of a tractor and a trailer connected to the tractor.

In Embodiment 1, all the loads are completely transported within the amount of charge at the start time of operation. In this embodiment, in addition to the amount of charge at the start time of operation, each trailer is charged with electric power at a charging station placed in the loading and unloading place during the loading and unloading operation and then travels.

This embodiment has the configuration of delivery system 1, the operations of the tractor and the trailers, and the configuration of plan making device 101 etc. in common with Embodiment 1 (see FIGS. 1 to 5). However, the making processing of plan making device 101 is different from that in Embodiment 1. The differences from Embodiment 1 will be described below.

When making a delivery plan in step S102 (see FIG. 4), plan making device 101 takes charging of the tractor in the loading and unloading operation into consideration. Plan making device 101 makes the delivery plan not to run out the battery of each vehicle.

Specifically, when formulating the minimum cost flow problem, the following limiting condition is added to the limiting conditions used in Embodiment 1. The amount of the electric power for charging during the loading and unloading operation is set to each edge connecting the start and end of the loading and unloading operation of the tractor. At each edge included in the flow of each vehicle, the result of balancing the amounts of the power consumption and the power charge is zero or greater. Accordingly, plan making device 101 makes a delivery plan not to run out the battery of each vehicle.

In other words, plan maker 110 generates a delivery plan satisfying the condition (i.e., the third condition) of charging at least one of the plurality of trailers at at least one of the destinations. Here, the charging may be performed when carrying in or out goods to be delivered by the at least one of the trailers.

The third condition described above is more specifically expressed by following Equation (11).

[Math. 20]

$$p_i^k + R_{ij}x_{ij}^k = p_j^k \quad (11)$$

In above Equation (11),

[Math. 21]

$R_{ij}$ is the amount of the electric power for charging the trailer in the transition from state i to state j, and is zero or a positive value.

Figure 11:
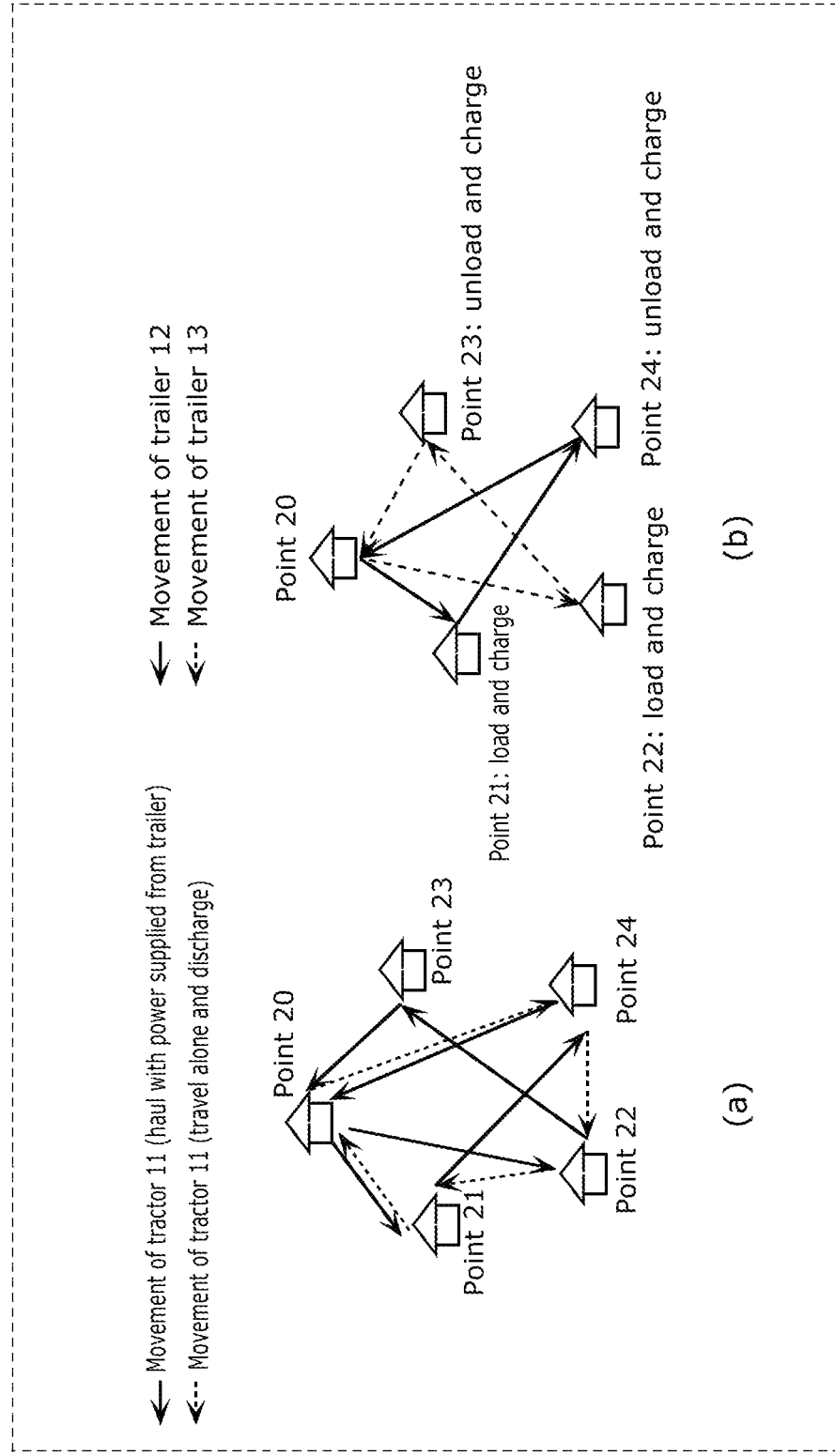
FIG. 11 illustrates example travel of a tractor and trailers according to Embodiment 2.

FIG. 11 illustrates example travel of tractor 11 and the trailers according to this embodiment.

In FIG. 11, (a) shows the movement of tractor 11, and corresponds to (a) of FIG. 9 in Embodiment 1. On the other hand, (b) of FIG. 11 shows the movements of trailers 12 and 13, and corresponds to (a) of FIG. 10 in Embodiment 1.

Here, unlike Embodiment 1, trailers 12 and 13 are charged during the loading and unloading operation. In FIG. 11, (a) and (b) have the other ways of traveling in common with (a) of FIGS. 10 and 11, respectively, and the description thereof will thus be omitted.

In this configuration, each trailer is charged during the loading and unloading operation, which allows travel at a longer distance and transportation of loads in a wider range than in Embodiment 1.

[Variation]

In Embodiment 2, the batteries of the trailers are charged. However, each of the battery levels of the tractor and the plurality of trailers may be kept at an upper limit or lower. For example, assume that a delivery plan is made by solving a mixed integer programming problem. In this case, the variables representing the battery levels of the tractor and the plurality of trailers are added to the mixed integer programming problem. The limiting condition where battery levels do not exceed the upper limits may be added. This retards the deterioration of the batteries caused by overcharge.

In Embodiment 1, each of the battery level of the tractor and the total battery level of the plurality of trailers is kept at the lower limit or above. Each of the battery levels of the tractor and the plurality of trailers may be kept at the lower limit or above. For example, assume that a delivery plan is made by solving a mixed integer programming problem. In this case, the variables representing the battery levels of the tractor and the plurality of trailers are added to the mixed integer programming problem. The limiting condition where the battery levels do not exceed the lower limits may be added. This retards the deterioration of the batteries caused by overdischarge.

As described above, the information processing method according to the embodiments described above takes the battery levels of the tractor and the trailers into consideration. In the method, a delivery plan is made that allows delivery of goods, while keeping the battery levels of the tractor and the trailers above the lower limit during the delivery period. The tractor and the trailers then travel in accordance with the made delivery plan to deliver goods while keeping the battery levels above the lower limit during the delivery period. Accordingly, the information processing method described above allows efficient delivery of goods without running out at least one of the batteries of the tractor and the trailer connected to the tractor.

A delivery plan is made with the charging of the trailers at the destinations taken into consideration. Thus, even if the tractor and the trailers fail to have sufficient levels of the batteries at the initial stage of the delivery period, the delivery of goods can be completed by the charging as necessary during the delivery period. In this manner, the information processing method described above allows efficient and more proper delivery of goods without running out at least one of the batteries of the tractor and the trailer connected to the tractor, with the charging during the delivery period taken into consideration.

The trailers are charged when carrying in or out the goods to be delivered. There is thus no need to take any dedicated time for charging the trailers. If there is a need to take the dedicated time for charging, this time may extend the delivery period. In this manner, goods can be efficiently delivered without taking any dedicated time for charging during the delivery period or without running out at least one of the batteries of the tractor and the trailer connected to the tractor.

Alternatively, the tractor is charged while hauling a trailer and moving. There is thus no need to take any dedicated time for charging. If there is a need to take the dedicated time for charging, this time may extend the delivery period. In this manner, goods can be efficiently delivered without taking any dedicated time for charging during the delivery period or without running out at least one of the batteries of the tractor and the trailer connected to the tractor.

The battery levels of the tractor and the trailers are kept not to exceed the upper limit of the recommended range of the battery level during the delivery period. This reduces the deterioration of the batteries of the tractor and the trailers. Accordingly, goods can be efficiently delivered without running out the batteries while reducing the deterioration of the batteries of the tractor and the trailers.

A delivery plan requiring a shorter delivery period is preferentially generated. In accordance with the generated delivery plan, the tractor and the trailers complete the delivery of goods in a shorter time. Using a vehicle driven by the batteries mounted on both the tractor and the trailers, goods can be efficiently delivered in a shorter time without running out the batteries.

In the embodiments described above, the constituent elements may be implemented as dedicated hardware or may be implemented by executing software programs suitable for the constituent elements. The constituent elements may be implemented by a program executer such as a CPU or a processor reading out and executing a software program stored in a storage medium such as a hard disk or a semiconductor memory. The software program achieving the information processing device according to the embodiments is as follows.

Specifically, this program causes a computer to execute the following information processing method. The computer obtains tractor information including a battery level of a tractor, trailer information including battery levels of a plurality of trailers, and delivery information including identification information and destinations of goods to be delivered. The computer generates a delivery plan using the tractor information, the trailer information, and the delivery information, and outputs the delivery plan generated. The delivery plan causes the tractor to move the plurality of trailers, each carrying distributed ones of the goods to be delivered, to the destinations. The delivery plan satisfies (a) a first condition and (b) a second condition. Under (a) the first condition, when moving the plurality of trailers, the tractor travels using at least one of a battery of a trailer being moved among the plurality of trailers or a battery of the tractor. Under (b) the second condition, the battery level of the tractor is kept above a first lower limit, and the battery levels of the plurality of trailers are kept above a second lower limit.

As described above, the information processing method according to one or more aspects has been described based on the embodiments. The present disclosure is however not limited to these embodiments. The one or more aspects may include other embodiments, such as those obtained by variously modifying the embodiment as conceived by those skilled in the art or those achieved by freely combining the constituent elements in the embodiment without departing from the scope and spirit of the present disclosure.

INDUSTRIAL APPLICABILITY

The technique according to the present disclosure is useful as a method of traveling a hauling vehicle that is an electric vehicle, and a method of making a delivery plan.

The invention claimed is:

1. An information processing method executed by a computer, the information processing method comprising:
    obtaining tractor information including a battery level of a tractor, trailer information including battery levels of a plurality of trailers, and delivery information including identification information and destinations of goods to be delivered;
    generating a delivery plan using the tractor information, the trailer information, and the delivery information; and
    outputting the delivery plan generated,
    the delivery plan causing the tractor to move the plurality of trailers, each carrying distributed ones of the goods, to the destinations, and satisfying:
        (a) a first condition that, when moving the plurality of trailers, the tractor travels using at least one of a battery of a trailer being moved among the plurality of trailers or a battery of the tractor;
        (b) a second condition that both (i) the battery level of the tractor is kept above a first lower limit and (ii) the battery levels of the plurality of trailers are kept above a second lower limit; and
        (c) a third condition that the battery of the tractor is charged using the battery of the one of the plurality of trailers that is being moved.

2. The information processing method according to claim 1, wherein
    the generating includes generating the delivery plan that further satisfies a fourth condition that at least one of the plurality of trailers is charged at at least one of the destinations.

3. The information processing method according to claim 2, wherein
    the at least one of the plurality of trailers is charged when carrying in or out the distributed ones of the goods to be delivered by the at least one of the plurality of trailers.

4. The information processing method according to claim 1, wherein
    the generating includes generating the delivery plan that further satisfies a fourth condition that the battery level of the tractor is kept at a first upper limit or lower, and the battery levels of the plurality of trailers are kept at a second upper limit or lower.

5. The information processing method according to claim 1, wherein
    the generating includes generating, as the delivery plan, one candidate out of a plurality of candidates for the delivery plan each satisfying at least the first condition, the second condition, and the third condition, the one candidate satisfying a condition related to a time required to deliver the goods.

6. An information processing system, comprising:
    an obtainer that obtains tractor information including a battery level of a tractor, trailer information including battery levels of a plurality of trailers, and delivery information including identification information and destinations of goods to be delivered;

a plan maker that generates a delivery plan using the tractor information, the trailer information, and the delivery information; and an outputter that outputs the delivery plan generated, the delivery plan causing the tractor to move the plurality of trailers, each carrying distributed ones of the goods, to the destinations, and satisfying:
- (a) a first condition that, when moving the plurality of trailers, the tractor travels using at least one of a battery of a trailer being moved among the plurality of trailers or a battery of the tractor;
- (b) a second condition that both (i) the battery level of the tractor is kept above a first lower limit and (ii) the battery levels of the plurality of trailers are kept above a second lower limit; and
- (c) a third condition that the battery of the tractor is charged using the battery of the one of the plurality of trailers that is being moved.

* * * * *